Jan. 30, 1962 E. J. McCLEARY, JR., ETAL 3,018,715
FOOD MACHINERY
Filed April 6, 1959 4 Sheets-Sheet 1
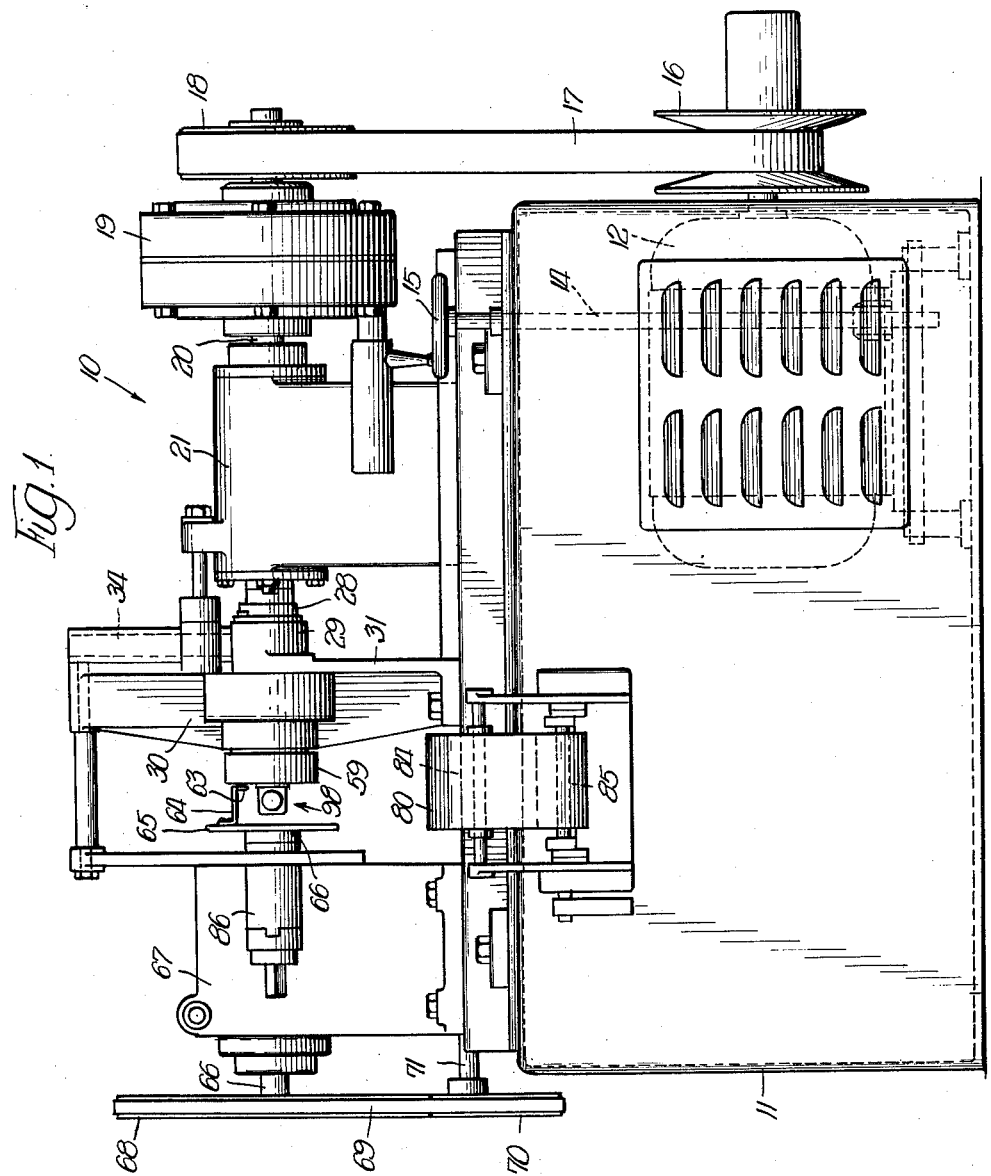
INVENTORS
Eugene J. M<sup>c</sup>Cleary, Jr.,
BY Cyrus H. Heigl,
Robert R. Lockwood
Atty.

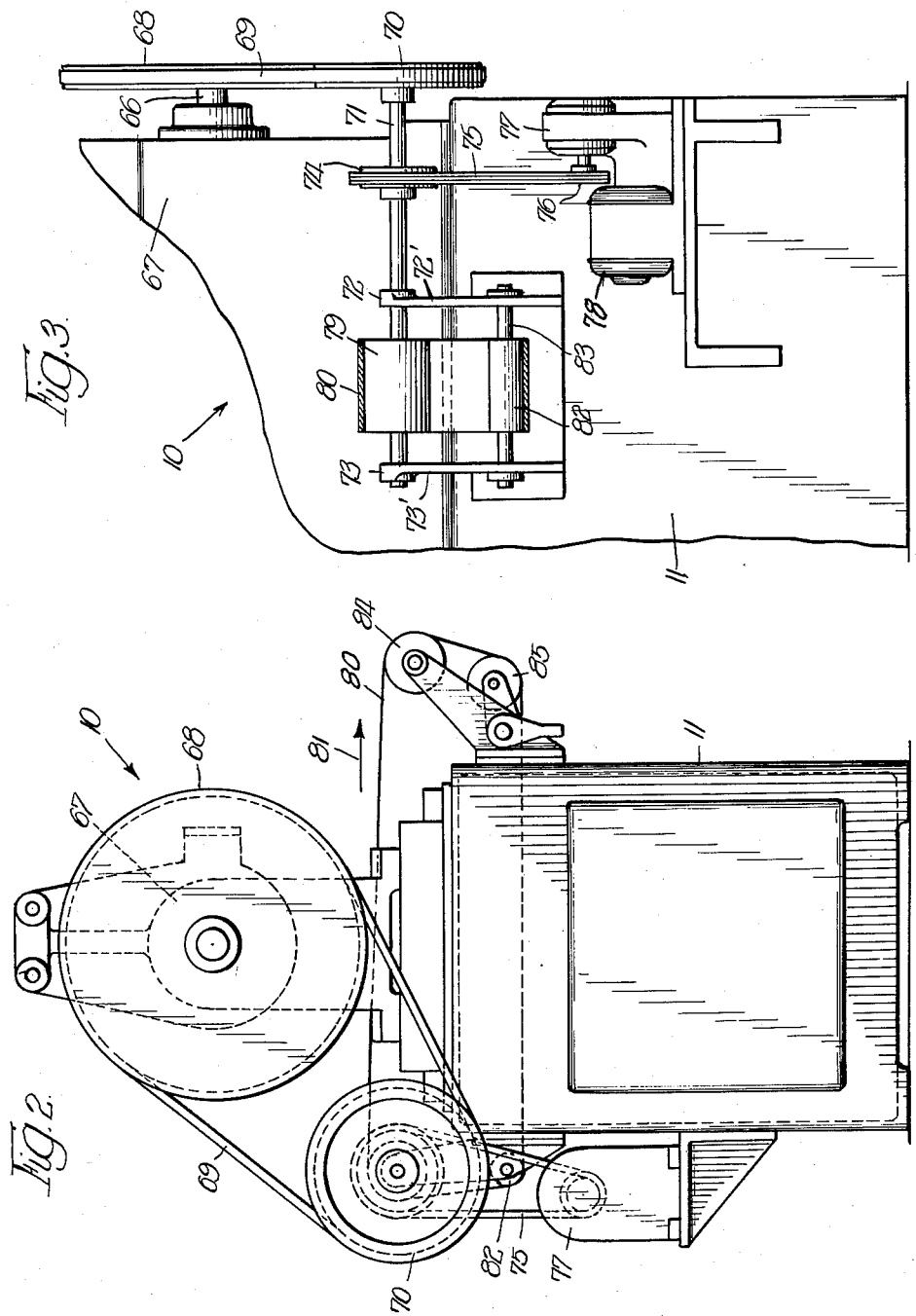

Jan. 30, 1962 E. J. McCLEARY, JR., ETAL 3,018,715

FOOD MACHINERY

Filed April 6, 1959 4 Sheets-Sheet 3

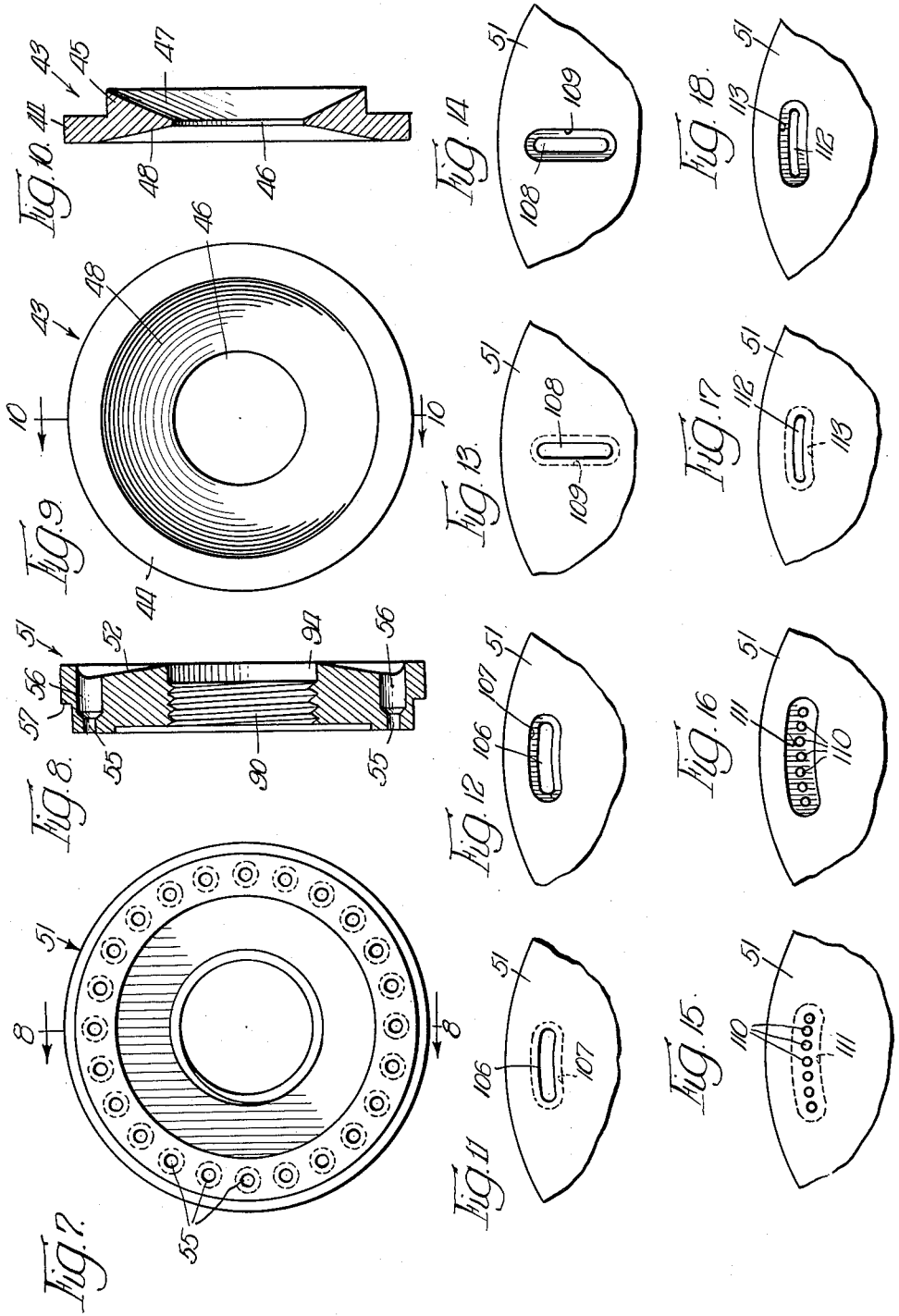

3,018,715
FOOD MACHINERY
Eugene J. McCleary, Jr., and Cyrus H. Heigl, Beloit, Wis., assignors to Adams Corporation, Korn Kurls Division, Beloit, Wis., a corporation of Delaware
Filed Apr. 6, 1959, Ser. No. 804,323
13 Claims. (Cl. 99—238)

This invention relates, generally, to food machinery and it has particular relation to such equipment employed for the manufacture of puffed food products from starchy grain, such as corn, rice, wheat, oats, barley, rye, soy beans and the like.

In the starting up of apparatus for converting a starchy grain mix into a puffed food product, difficulty is often encountered in obtaining proper operating conditions. This is particularly the case when the plastic mix is extruded through a number of openings. The material may flow through some of the openings while the other openings may become clogged. The clogging may be caused by the presence of particles of the grain which have not become converted into the fluid or plastic state. This likelihood limits the cross sectional area of the openings to such a size that these particles can be passed therethrough and thus the minimum size of the resultant puffed product is correspondingly limited. In some instances it is necessary to shut down the machine and dismantle it before attempting to continue with the operation. Once properly started, it is then desirable to operate the machine continuously and this may result in over production.

Accordingly, among the objects of this invention are: To provide for starting the operation of a machine for manufacturing puffed food products in a new and improved manner; to provide for such improved operation in a machine having a number of discharge openings through which the plastic mix is extruded; to permit a wide variation in the size and shape of the discharge openings; to provide for by-passing the discharge openings and permit the discharge of the mix temporarily through an orifice until the desired operating conditions are obtained; to prevent the flow of the plastic mix to the discharge opening and permit it to flow through a separate discharge orifice having a cross sectional area equal to the sum of the cross sectional areas of a number of the discharge openings; to provide a valve for controlling the flow of the plastic mix to the discharge openings and another valve for controlling the flow of the plastic mix through the discharge orifice; to provide discharge openings having various non-circular cross sectional shapes in order to produce the puffed food product in a corresponding variety of shapes and sizes; and to combine the valve mechanism that controls the flow of the plastic mix to the discharge openings with the valve mechanism that controls the flow of the plastic mix through the discharge orifice.

Other objects of this invention will, in part, be obvious and in part appear hereinafter.

This invention is disclosed in the embodiment thereof shown in the accompanying drawings and it comprises the features of construction, combination of elements, arrangement of parts and method of operation which will be exemplified in the construction hereinafter set forth and the scope of the application of which will be indicated in the appended claims.

For a more complete understanding of the nature and scope of this invention reference can be had to the following detailed description, taken together with the accompanying drawings, in which:

FIGURE 1 is a view, in side elevation, of a machine in which the present invention is embodied;

FIGURE 2 is a view of the machine, shown in FIGURE 1, the view being taken looking from left to right;

FIGURE 3 is a view, partly in rear elevation and partly in section, of a portion of the machine shown in FIGURE 1;

FIGURE 7 is an elevational view, at an enlarged scale, of the die plate;

FIGURE 8 is a vertical sectional view taken generally along the line 8—8 of FIGURE 7;

FIGURE 9 is an elevational view, at an enlarged scale, of the flow plate;

FIGURE 10 is a vertical sectional view taken generally along the line 10—10 of FIGURE 9;

FIGURE 11 is an enlarged fragmentary view of the die plate showing an arcuate opening for the discharge of the plastic mix in order to make the product in a "pillow" form;

FIGURE 12 is a view in rear elevation of the portion of the die plate shown in FIGURE 11;

FIGURE 13 is a view of another configuration of opening in the die plate which can be employed to produce the product in "Brazil nut" form;

FIGURE 14 is a view, in rear elevation, of the portion of the die plate shown in FIGURE 13;

FIGURE 15 is a view of a portion of the die plate 15 provided with a large number of openings to make the product in "bread stick" form;

FIGURE 16 is a view, in rear elevation, of the portion of the die plate shown in FIGURE 15;

FIGURE 17 is a view showing another shape for the opening in the die plate so as to provide the final product in a "ribbon" form; and FIGURE 18 is a view, in rear elevation, of the portion of the die plate shown in FIGURE 17.

Figure 4:
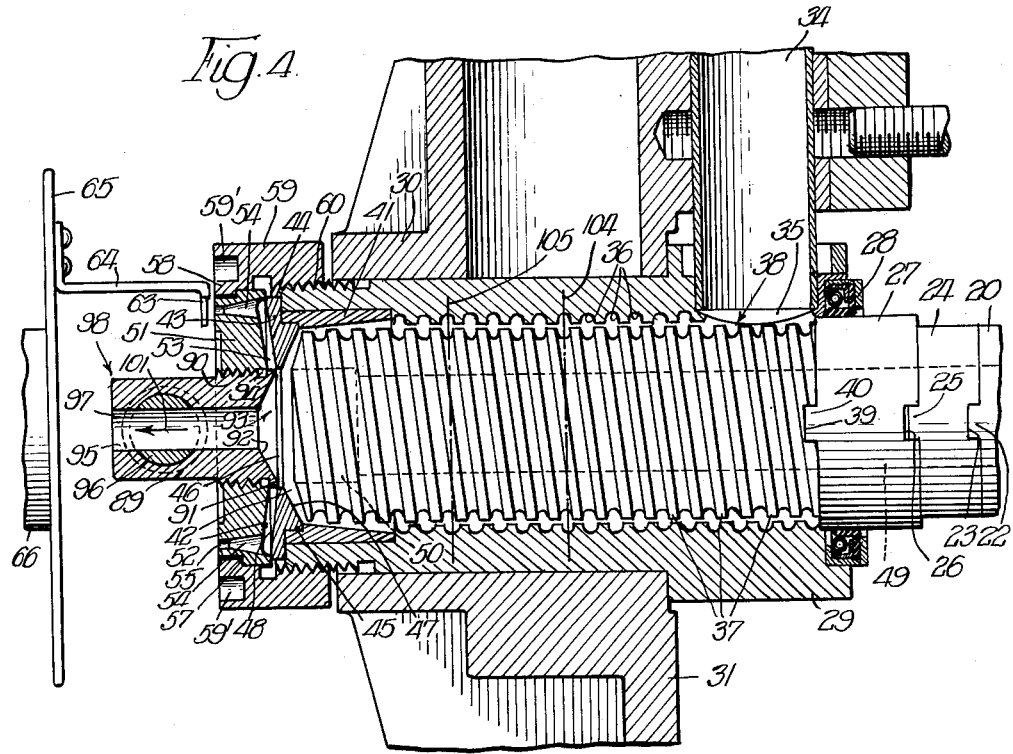
FIGURE 4 is a vertical sectional view, at an enlarged scale, of the stator housing, stator and rotating knife, the feed screw within the stator being shown in elevation, the arrangement being shown in the start up condition.

Referring now particularly to FIGURE 1 of the drawings, it will be observed that the reference character 10 designates, generally, a machine that can be employed for converting a meal type mix into a puffed food product. The machine 10 includes a hollow frame base 11 within which there is located a feed screw motor 12. The position of the feed screw motor 12 can be changed by a screw 14 which is operated by a hand wheel 15 located at the upper side of the hollow frame base 11. The feed screw motor 12 is arranged to drive a V-pulley 16 over which a belt 17 is trained to drive a pulley 18 which operates through a speed reducer 19 of the gear type to drive a shaft 20. The shaft 20 is journaled in a screw drive housing 21 that is carried by the hollow frame base 11.

Referring now particularly to FIGURE 4 of the drawings, it will be observed that the shaft 20 is provided with a transverse rib 22 for interfitting with a slot 23 in a drive collar 24. The drive collar 24 is likewise provided with a transverse rib 25 which interfits with a slot 26 in a drive collar 27 that is journaled in a bearing 28 carried by a stator 29 which is mounted in a stator housing 30 that is carried by a support 31 extending upwardly from the upper side of the hollow frame base 11.

A meal type mix is fed to the machine 10 through an intake 34 which opens at 35 into the interior of the stator 29. It will be observed that the raw material is inserted into the stator 29 at one end, the right end as seen in FIGURE 4. The stator 29 is internally threaded at 36 to cooperate with external threads 37 on a feed screw that is indicated, generally, at 38. The right end of the feed screw 38 is provided with a transverse slot 39 with which a rib 40 in the drive collar 27 interfits. At the left end of the stator 29 there is an annular insert 41 which defines a central aperture 42 for the left end of the stator 29 through which the mix in plastic form is caused to flow. Interfitting with the annular insert 41 is a flow plate that is indicated, generally, at 43 and the details of which are shown more clearly in FIGURES 9 and 10 of the drawings.

The flow plate 43 is provided with a marginal radial flange 44 which overlies the left end of the stator 29 and the left end of the annular insert 41. The flow plate 43 also is provided with a shouldered portion 45 that interfits with the left end of the annular insert 41. A central aperture 46 is provided by the flow plate 43 which is in alignment with the axis of rotation of the rotor 38 and registers with the central aperture 42. The mix in plastic form is directed to the central aperture 46 in the flow plate 43 over an inclined inner side wall 47 of the flow plate 43 and then flows radially outwardly over an inclined outer side wall 48. It will be observed that the angle of inclination of the inner side wall 47 away from the vertical is greater than that of the outer side wall 48.

Any suitable means can be employed for non-rotatably interconnecting the feed screw 38 and the shaft 20. For example, a shaft extension 49, shown by broken lines in FIGURE 4, is secured at the right end to the shaft 20 and extends through the drive collars 24 and 27 and also through the feed screw 38. At the left end there is a head 50 which serves to hold the several parts in assembled relation on the shaft extension 49.

Figure 5:
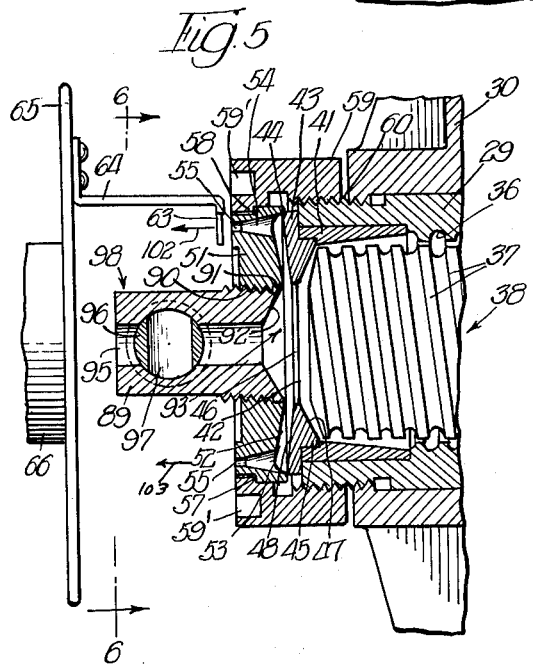
FIGURE 5 is a view, similar to FIGURE 4, and showing the left end portion thereof with the arrangement being such that the machine is in proper operation.
Figure 6:
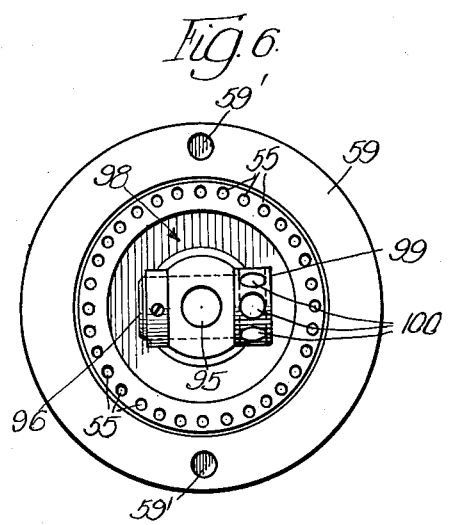
FIGURE 6 is a view, in end elevation, of the stator and is taken generally along the line 6—6 of FIGURE 5, the knife blade and its support being omitted.

The left end of the stator 29 is closed off by a die plate 51, the details of construction of which are shown more clearly in FIGURES 7 and 8 of the drawings. Here it will be observed that the die plate 51 is provided on the right side with a frusto-conical inner surface 52 which overlies the inclined outer side wall 48 of the flow plate 43 and is parallel thereto thereby providing an annular space 53, FIGURE 4, through which the plastic mix flows radially outwardly into counter sunk conical openings 54, shown in FIGURES 4 and 5, that open in the left side of the die plate 51 through small diameter discharge openings 55 which are positioned along a circle the center of which is the axis of rotation of the feed screw 38. In FIGURES 7 and 8 of the drawings cylindrical openings 56 are shown instead of conical openings as previously described. Along the left side of the die plate 51 there is provided an annular shoulder 57 against which an annular shoulder 58, FIGURE 4, of a locking ring 59 bears to hold the die plate 51, flow plate 43 and annular insert 41 in position on the left end of the stator 29. Openings 59', FIGURE 6, are provided in the left face of the locking ring 59 for receiving a spanner wrench. The left end of the stator 29 is threaded as indicated at 60 for receiving the locking ring 59.

It will be understood that the plastic mix is extruded through the small diameter discharge openings 55 in the die plate 51 in the form of streamlets. These are severed by a knife blade 63 which is carried by an arm 64 that is mounted on a plate 65 which rotates with a shaft 66 that is journaled in a housing 67, FIGURE 1, carried by the hollow frame base 11. The shaft 66 is driven by a pulley 68 over which a belt 69 is trained. The belt 69 is driven by a pulley 70, FIGURE 3, which is carried by a shaft 71 that is journaled in bearings 72 and 73 that are located in the upper ends of bearing brackets 72' and 73' respectively. The shaft 71 carries a pulley 74 which is driven by a belt 75 that is trained over a pulley 76 on a gear reducer 77. The gear reducer 77 is driven by a motor 78.

Also mounted on the shaft 71 is a pulley 79 over which a conveyor belt 80 is trained for rotation in the direction indicated by the arrow 81 in FIGURE 2. The conveyor belt 80 extends over a guide pulley 82 which is carried by a shaft 83 that is journaled in the bearing brackets 72' and 73'. The conveyor belt 80 also is trained over guide pulleys 84 and 85. It will be understood that the conveyor belt 80 is provided for removing the severed streamlets which are extruded through the small diameter discharge opening 55 in the guide plate 51. The position of the knife blade 63 can be adjusted by adjusting means 86. It is desirable to position the knife blade 63 as close as possible to the die plate 51. In the initial operation of the machine 10 the position of the knife blade 63 is variable in order to take care of expansion of the various metallic parts as the temperature thereof rises.

As pointed out hereinbefore, difficulty has been encountered during the initial phases of operation of the machine 10. The raw meal type mix is fed through the intake tube 34 into the stator 29 and some of the particles in the raw form may appear at the left end of the stator 29. Because of the relatively small cross section of the annular space 53 between the outer side wall 48 of the flow plate 43 and the inner surface 52 of the die plate 51 and also because of the small diameter of the discharge openings 55, there is the possibility that plugging may take place with the result that the final plastic mix may be extruded through only a portion of the small diameter discharge openings 55 while the remaining openings are filled with the raw particles of the meal type mix.

With a view to completely by-passing the annular space 53 and the small diameter discharge openings 55 during the initial start up phase of the machine 10, an externally threaded plug 89 is screwed into an internal thread 90 of the die plate 51. The plug 89 has a shoulder 91 at its right end which interfits with the central aperture 46 in the flow plate 43 in one position as shown in FIGURE 4. Here the inner end surface 92 of the plug 89 is inclined so as to constitute an extension of the inner side wall 47 of the flow plate 43. It will be observed that the right end of the plug 89 in conjunction with the boundary provided by the flow plate 43 for the central aperture 46 together provide a valve that is indicated, generally, at 93, and serves to cut off the flow of the plastic mix out of the central aperture 42 of the stator 29 through the aperture 46 in the flow plate 43 into the annular space 53. When the plug 89 is rotated so as to move to the left to the position shown in FIGURE 5, the shoulder 91 thereon interfits with an annular recess 94 in the right side of the die plate 51.

When the plug 89 is in the position shown in FIGURE 4 where the valve 93 is closed, the plastic mix is diverted to flow through a central longitudinal orifice 95 in the plug 89. The cross sectional area of the orifice 95 is substantially larger than the cross sectional area of any one of the small diameter discharge openings 55. Preferably the cross sectional area of the orifice 95 is equal to the sum of the cross sectional areas of a large number of the small diameter discharge openings 55. The flow of the plastic mix through the orifice 95 is controlled by a cylindrical valve member 96 which is rotatably mounted in a suitable cylindrical opening extending transversely to the orifice 95 and provided with a valve opening 97 of the same diameter as that of the orifice 95. It will be observed that the valve member 96 and the associated portion of the plug 89 constitute a valve that is indicated, generally, at 98, this valve being the one which controls the flow of the plastic mix through the orifice 95. As shown in FIGURE 6 one end of the cylindrical valve member 96 is provided with a head 99 that has radial openings 100 for receiving a wrench that is used not only for rotating the cylindrical valve member 96 but also can be used for rotating the plug 89 so as to open or close the valve 93.

When the valve 93 is in the closed position as shown in FIGURE 4, the plastic mix flows outwardly through the orifice 95 as indicated by the arrow 101 when the valve 98 is in the open position. When the valve 93 is opened and the valve 98 is closed, as shown in FIGURE 5, the plastic mix is extruded through the small diameter openings 55 as indicated by the arrows 102 and 103. As the streamlets emerge from the small diameter discharge opening 55, they are cut by the knife blade 63 which, it will be recalled, is rotated relative to the die plate 51. The speed at which the knife blade 63 is rotated determines the length of the streamlets which, when they encounter the atmosphere, puff up and increase their size.

When the machine 10 is in proper operating condition and the various parts have been raised to the operating temperatures, the raw meal type mix, which is introduced through the intake tube 34 into the right end of the stator 29, is converted into a plastic mix. The zone at which this takes place begins approximately along the intermediate portion of the stator 29 that is indicated by the broken line 104. The plasticizing zone extends to the position indicated by the broken line 105. Thereafter the material is in a complete plastic state and no particles of the raw material are present therein.

Since the proper operating conditions in the plasticizing zone between the lines 104 and 105 are obtained only after the machine 10 has been started up, the advantages resulting from the provision of the valves 93 and 98 become apparent. During the start up phase of the machine 10, the valve 93 is closed and the mix is caused to flow out of the orifice 95 as long as the valve 98 remains open. The material produced during this period is scrapped and can be discarded. Also, during this period the knife blade 63 need not be rotated and, if desired, it can be completely withdrawn from its normal operating position with respect to the die plate 51. The first meal mix introduced into the stator 29 for starting up the machine 10 does not plasticize in the zone between the lines 104 and 105. Rather, during the initial period of operation it passes through the orifice 95 in the plug 89 as raw meal. Since the plug 89, through which the orifice 95 extends, provides a restriction, this effects a "back-up pressure" in the stator 29 accompanied by a temperature rise. The mix then undergoes plasticization in the zone between the lines 104 and 105. The initial steps are: (1) raw meal; (2) raw meal and partial plasticization; (3) full plasticization. Then the valve 93 is opened by withdrawing the plug 89 from the aperture 46 in the flow plate 43 and the valve 98 is closed by turning the valve member 96. When an attempt is made to start up without permitting the initial discharge to take place through the orifice 95, there is the likelihood that the openings 55 will be plugged tight and back-up of the mix will then occur without extrusion taking place.

The discharge through the orifice 95 in the plug 89 continues until the proper consistency and expansion of the mix is produced. During this period the annular space 53, counter sunk openings 54 or 56 and the small diameter openings 55 are completely free from the mix and thus there is no likelihood of their being plugged up. Upon the attainment of the proper operating conditions, the valve 93 is opened and the valve 98 is closed, as indicated. This shuts off the flow of the plastic mix in the direction indicated by the arrow 101 through the orifice 95 in the plug 89 and directs the flow through the annular space 53 and out of the small diameter discharge openings 55. Then the knife blade 63 can be positioned in operative relation to the die plate 51 and rotate in the manner described at the desired speed to sever the streamlets as they appear through the discharge openings 55.

By providing the valves 93 and 98 for selectively controlling the flow of the mix until the desired operating conditions are attained, it is possible to have a wide variation in the size and shape of the discharge openings 55. Four different configurations are shown in FIGURES 11–18 but it will be understood that other configurations also are possible.

As shown in FIGURES 11 and 12, which represent the front and rear faces of the die plate 51, arcuate openings are provided one of which is indicated at 106. They are located along a circle the center of which is the axis of rotation of the feed screw 38. A counter bore 107, the same general shape as the arcuate opening 106, is provided in the rear face of the die plate 51 for communicating with the annular space 53. By employing the arcuate opening 106 and providing a number of them in the die plate 51 in lieu of the small diameter discharge openings 55 it is possible to provide a puffed product in "pillow" form the length of which, of course, is determined by the speed at which the knife blade 63 is rotated.

FIGURES 13 and 14 show a radial slot 108 in the die plate 51. A number of these slots are located about a circle the center of which is the axis of rotation of the feed screw 38. A counter bore 109 is provided in the opposite face of the die plate 51 to communicate with the annular space 53. When a number of the radial slots 108 are provided in the die plate 51 in the manner described, the puffed product is in the form of a "Brazil nut" and of course the size of it is determined by the speed of the knife blade 63.

FIGURES 15 and 16 of the drawings show a large number of small openings 110 which are located along a circle the center of which is the axis of rotation of the feed screw 38. A single arcuate counter bore 111 is common to a number of the small openings 110. It will be understood that the cross sectional area of each of the small openings 110 is substantially less than the cross sectional area of the small diameter discharge openings 55 shown in the die plate 51 as illustrated in FIGURES 7 and 8 of the drawings. Since the mix to be extruded is in the plastic state when the valve arrangement previously described is employed, it is possible to use much smaller diameter extrusion openings since there is no likelihood of their becoming plugged up by particles of the raw mix. When the large number of small openings 110 are used, the product in puffed form is of "break stick" configuration.

FIGURES 17 and 18 show a configuration which is similar to that illustrated in FIGURES 11 and 12. Here arcuate slots, indicated at 112, are provided which are substantially narrower than the arcuate openings 106 previously described. A counter bore 113 in the rear side of the die plate 51 places the slots 112 in communication with the annular space 53. Using the relatively small width of slot 112 it is possible to provide a puffed product in "ribbon" form the length of each ribbon being determined by the speed at which the knife blade 63 is rotated.

It will be understood that the puffed product in any of the several forms and shapes previously referred to is deposited on the conveyor belt 80 and is thereby removed from the machine 10. The product is subsequently processed to apply coloring, seasoning and the like. For example, the puffed product can be treated with a cheese preparation to provide a cheese taste. Subsequently the treated, colored and seasoned product is packaged for distribution to the public.

Since certain changes can be made in the foregoing construction and method and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. A machine for converting a starchy grain mix into a puffed food product comprising, in combination, a hollow stator, means for feeding the mix to said stator, a feed screw mounted for rotation within said stator for moving the mix out of one end thereof, die means closing off said one end of said stator and having a plurality of openings through which the mix is extruded into the atmosphere where it expands and solidifies on contact with the air, valve means for controlling the flow of the mix through said openings, means providing an orifice into said one end of said stator, and valve means for controlling the flow of the mix through said orifice.

2. A machine for converting a starchy grain mix into a puffed food product comprising, in combination, a hollow stator having a longitudinal axis, means for feeding the mix to said stator, a feed screw mounted for rotation about said longitudinal axis within said stator for moving the mix out of one end thereof, die means extending transversely of said longitudinal axis and closing off said one end of said stator and having a plurality of openings extending transversely therethrough along a circle the center of which lies along said longitudinal axis and through which the mix is extruded into the atmosphere where it expands and solidifies on contact with the air, means providing an orifice into said one end of said stator, and valve means for controlling the flow of the mix through said orifice.

3. A machine for converting a starchy grain mix into a puffed food product comprising, in combination, a hollow stator, means for feeding the mix to said stator, a feed screw mounted for rotation within said stator for moving the mix out of one end thereof, a die plate closing off said one end of said stator and having a plurality of openings through which the mix is extruded into the atmosphere where it expands and solidifies on contact with the air, valve means for controlling the flow of the mix through said openings, means providing an orifice through said die plate into said one end of said stator, and valve means for controlling the flow of the mix through said orifice.

4. A machine for converting a starchy grain mix into a puffed food product comprising, in combination, a hollow stator, means for feeding the mix to said stator, a feed screw mounted for rotation within said stator for moving the mix out of one end thereof, a die plate closing off said one end of said stator and having a plurality of openings through which the mix is extruded into the atmosphere where it expands and solidifies on contact with the air, valve means for controlling the flow of the mix through said openings, means providing an orifice through said die plate into said one end of said stator, and valve means for controlling the flow of the mix through said orifice, the orifice providing means forming a part of the first mentioned valve means.

5. A machine for converting a starchy grain mix into a puffed food product comprising, in combination, a hollow stator, means for feeding the mix to said stator, a feed screw mounted for rotation within said stator for moving the mix out of one end thereof, means providing a central aperture at said one end of said stator through which the mix flows, a die plate closing off said one end of said stator beyond said central aperture and having a plurality of openings through which the mix is extruded from said central aperture into the atmosphere where it expands and solidifies on contact with the air, a plug movably mounted on said die plate for closing said central aperture and controlling the flow of the mix through said openings, said plug having an orifice communicating at one end with said central aperture when it is closed by said plug and at the other end with the atmosphere, and valve means for controlling the flow of the mix through said orifice.

6. A machine for converting a starchy grain mix into a puffed food product comprising, in combination, a hollow stator, means for feeding the mix to said stator, a feed screw mounted for rotation within said stator for moving the mix out of one end thereof, die means closing off said one end of said stator and having a plurality of non-circular openings through which the mix is extruded into the atmosphere where it expands and solidifies on contact with the air, valve means for controlling the flow of the mix through said openings, means providing an orifice into said one end of said stator, and valve means for controlling the flow of the mix through said orifice.

7. A machine for converting a starchy grain mix into a puffed food product comprising, in combination, a hollow stator, means for feeding the mix to said stator, a feed screw mounted for rotation within said stator for moving the mix out of one end thereof, die means closing off said one end of said stator and having a plurality of openings through which the mix is extruded into the atmosphere where it expands and solidifies on contact with the air, said openings being non-circular and located in uniform arcuate spaced relation along a circle, valve means for controlling the flow of the mix through said openings, means providing in orifice into said one end of said stator, and valve means for controlling the flow of the mix through said orifice.

8. A machine for converting a starchy grain mix into a puffed food product comprising, in combination, a hollow stator, means for feeding the mix to said stator, a feed screw mounted for rotation within said stator for moving the mix out of one end thereof, die means closing off said one end of said stator and having a plurality of openings through which the mix is extruded into the atmosphere where it expands and solidifies on contact with the air, said openings being in the form of radial slots, valve means for controlling the flow of the mix through said openings, means providing an orifice into said one end of said stator, and valve means for controlling the flow of the mix through said orifice.

9. A machine for converting a starchy grain mix into a puffed food product comprising, in combination, a hollow stator, means for feeding the mix to said stator, a feed screw mounted for rotation within said stator for moving the mix out of one end thereof, die means closing off said one end of said stator and having a plurality of openings through which the mix is extruded into the atmosphere where it expands and solidifies on contact with the air, said openings being in the form of generally arcuate slots, valve means for controlling the flow of the mix through said openings, means providing an orifice into said one end of said stator, and valve means for controlling the flow of the mix through said orifice.

10. A machine for converting a starchy grain mix into a puffed product comprising, in combination, a hollow stator, means for feeding the mix to said stator, a feed screw mounted for rotation with said stator for plasticizing the mix and moving it out of one end of said stator, a flow plate secured to said one end of said stator having a central aperture, a die plate secured to said one end of said stator in overlying relation to and spaced from said flow plate and having a plurality of circularly disposed openings communicating with the space between said plates and through which the plastic mix is extruded into contact with the air where it expands and solidifies, a plug having a longitudinal orifice, said plug being movably mounted on said die plate and at its inner end interfitting with said central aperture in said flow plate to close off said space between said plates from said stator, movement of said plug relative to said flow plate controlling the flow of the plastic mix into said space between said plates and out of said circularly disposed openings, and a valve member on said plug to control the flow of the plastic mix through said orifice.

11. A machine for converting a starchy grain mix into a puffed food product comprising, in combination, a hollow stator, means for feeding the mix to said stator, a feed screw mounted for rotation with said stator for plasticizing the mix and moving it out of one end of said stator, a flow plate secured to said one end of said stator having a central aperture, a die plate secured to said one end of said stator in overlying relation to and spaced from said flow plate and having a plurality of circularly disposed openings communicating with the space between said plates and through which the plastic mix is extruded into contact with the air where it expands and solidifies, a plug having a longitudinal central orifice threaded into the central portion of said die plate and at its inner end interfitting with said central aperture in said flow plate to close off said space between said plates from said stator, movement of said plug relative to said flow plate controlling the flow of the plastic mix into said space between said plates and out of said circularly disposed openings, and a valve member on said plug to control the flow of the plastic mix through said orifice.

12. A machine for converting a starchy grain mix into a puffed food product comprising, in combination, a hollow stator, means for feeding the mix to said stator, a feed screw mounted for rotation with said stator for plasticizing the mix and moving it out of one end of said stator, a flow plate secured to said one end of said stator having a central aperture with the wall defining said central aperture inclined thereto on both sides, a die plate secured to said one end of said stator in overlying relation to said flow plate having a frusto-conical inner surface in parallel spaced relation to the outer side of said flow plate and a plurality of circularly disposed openings of relatively small cross sectional area communicating with the space between said plates and through which the plastic mix is extruded into contact with the air where it expands and solidifies, a plug having a longitudinal central orifice threaded into the central portion of said die plate and at its inner end interfitting with said central aperture in said flow plate to close off said space between said plates from said stator, the cross sectional area of said orifice being relatively large as compared to the cross sectional area of any of said circularly disposed openings, movement of said plug relative to said flow plate controlling the flow of the plastic mix into said space between said plates and out of said circularly disposed openings, and a valve member on said plug to control the flow of the plastic mix through said orifice.

13. A machine for converting a starchy grain mix into a puffed food product comprising, in combination, a hollow stator, means for feeding the mix to said stator, a feed screw mounted for rotation with said stator for plasticizing the mix and moving it out of one end of said stator, a flow plate secured to said one end of said stator having a central aperture with the wall defining said central aperture inclined thereto on both sides with the greater angle of inclination on the inner side, a die plate secured to said one end of said stator in overlying relation to said flow plate having a frusto-conical inner surface in parallel spaced relation to the outer side of said flow plate and a plurality of circularly disposed openings of relatively small cross sectional area communicating with the space between said plates and through which the plastic mix is extruded into contact with the air where it expands and solidifies, a plug having a longitudinal central orifice threaded into the central portion of said die plate and a shoulder at its inner end interfitting with said central aperture in said flow plate and closing off said space between said plates from said stator, the cross sectional area of said orifice being relatively large as compared to the cross sectional area of any of said circularly disposed openings, movement of said plug relative to said flow plate controlling the flow of the plastic mix into said space between said plates and out of said circularly disposed openings, the inner end surface of said plug being inclined at substantially the same angle as said inner side of said flow plate and constituting a continuation thereof, and a cylindrical valve member extending transversely of and rotatable on said plug having a valve opening therethrough movable into and out of registry with said orifice to control the flow of the plastic mix therethrough.

References Cited in the file of this patent

UNITED STATES PATENTS

| | | |
|---|---|---|
| 1,725,171 | Anderson | Aug. 20, 1929 |
| 2,295,868 | Schwebke et al. | Sept. 15, 1942 |
| 2,489,267 | Chapin | Nov. 29, 1949 |
| 2,692,124 | Mendoza | Oct. 19, 1954 |
| 2,705,927 | Graves et al. | Apr. 12, 1955 |
| 2,778,322 | Moser | Jan. 22, 1957 |
| 2,802,430 | Filler | Aug. 13, 1957 |
| 2,842,072 | Graves | July 8, 1958 |
| 2,853,027 | Graves | Sept. 23, 1958 |